United States Patent [19]

Blomberg

[11] 4,120,236

[45] Oct. 17, 1978

[54] CORN POPPER

[75] Inventor: James K. Blomberg, Minneapolis, Minn.

[73] Assignee: The Popper's Choice Company, Minneapolis, Minn.

[21] Appl. No.: 844,650

[22] Filed: Oct. 25, 1977

[51] Int. Cl.² .............................................. A23L 1/18
[52] U.S. Cl. ................................ 99/323.9; 99/323.11
[58] Field of Search ............... 99/323.11, 323.6, 323.7, 99/323.9, 323.4, 323.5, 323.8; 34/109, 114, 115, 122

[56] References Cited

U.S. PATENT DOCUMENTS

| 1,516,782 | 11/1924 | Oberschmidt | 99/323.11 |
| 1,937,318 | 11/1933 | Dahl | 99/323.11 |
| 1,976,425 | 10/1934 | Young | 99/323.11 |
| 2,606,489 | 8/1952 | Morsette | 99/323.11 |
| 2,812,704 | 11/1957 | Hawks | 99/323.6 |
| 2,922,355 | 1/1960 | Green | 99/323.11 |
| 3,253,532 | 5/1966 | Jones | 99/323.7 |
| 3,931,757 | 1/1976 | Goode | 99/323.11 |

Primary Examiner—Robert W. Jenkins
Attorney, Agent, or Firm—Douglas L. Carlsen

[57] ABSTRACT

A popcorn popper wherein the corn is popped in a dry condition in a drum rotating on a horizontal axis. An electrical heater is attached to the periphery of the drum. The drum has inner and outer cylinder walls with a popping chamber between the walls and discharge chamber within the inner wall. A separator gate guides corn after it is popped from the popping chamber into the discharge chamber. A discharge chute extends outwardly from the discharge chamber and a carrier blade within the inner wall moves the popped corn to a position to be dumped into the discharge chute. There is also a fan for blowing the popped corn from the discharge chute upwardly through a spout into a container and the fan and drum are driven by the same motor.

8 Claims, 5 Drawing Figures

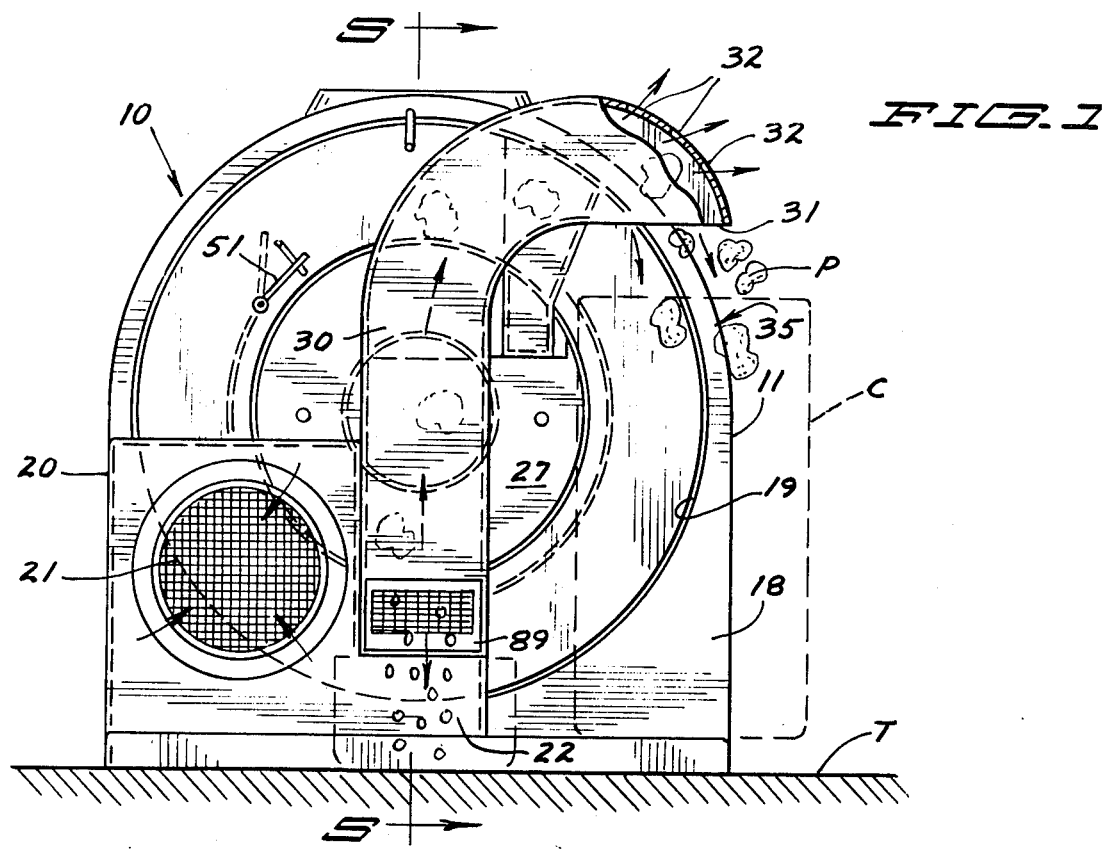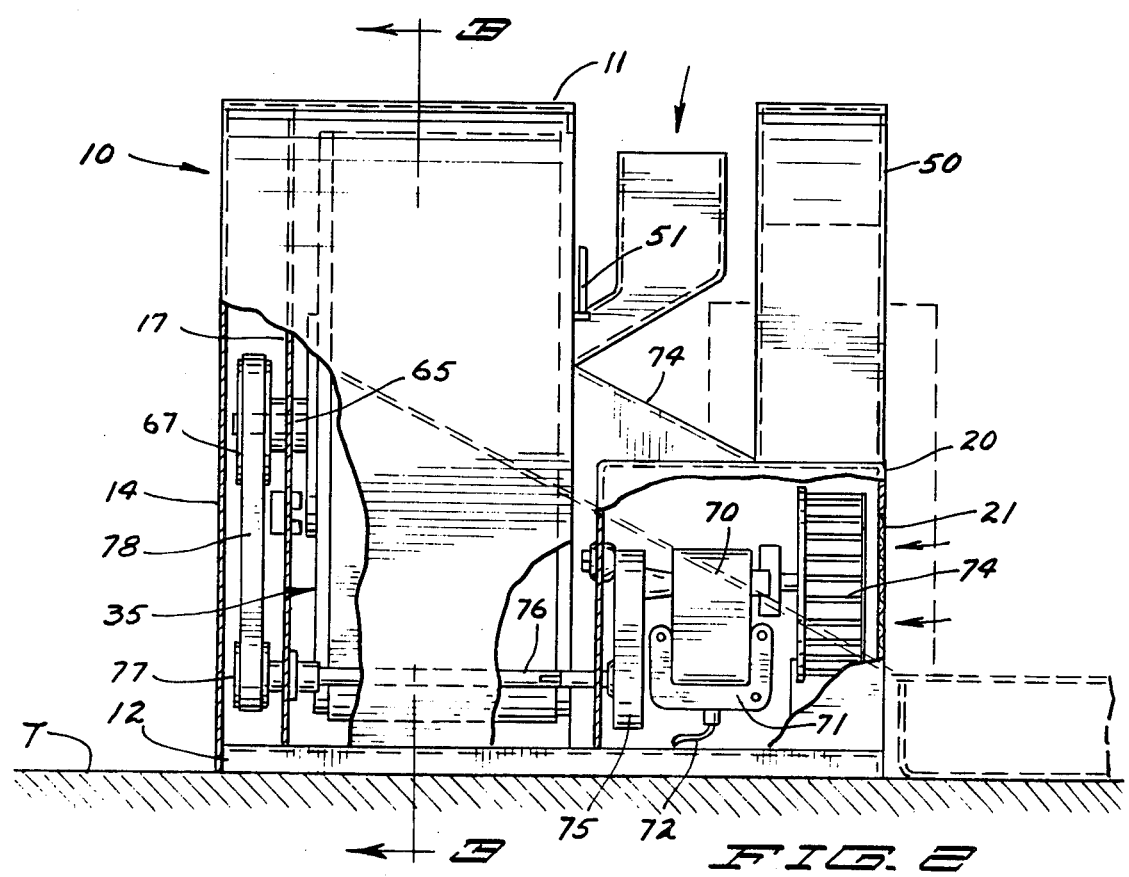

4,120,236

CORN POPPER

BACKGROUND OF THE INVENTION

The art of corn popping generally involves the use of one of two processes. In one method the popcorn kernels are immersed in or covered with a hot oil which heats the kernel until the starches therewithin expand to explode the outer hull leaving the popped kernel in the familiar blossom-like shape. This process, known as "wet popping" or the heated kettle method, of course, requires the expense of the cooking oil, much of which is wasted. Also it destroys the natural flavor of the popcorn by virtue of providing a coating on the corn.

Of greater importance, however, is the fact that in the wet popping process the corn kernel is heated from the outside in. This generally leaves the heart of the kernel unheated and only the outer portion of the kernel actually expands leaving an uncompletely popped kernel with a hard center core.

The most edible popped corn has a low density for tender chewing and ease of digestion. To achieve this the unpopped kernel must be heated equally through the entire mass to the highest temperature possible before the kernel explodes. This causes expansion to a maximum size creating maximum tenderness. This also causes maximum disintegration of the hull reducing the incidence of hull portions becoming stuck in the teeth or throat of the person eating the popcorn.

The other corn popping process is known as "dry popping" and does result in the greater kernel expansion mentioned above. Here no cooking oil is used but the corn kernels are subjected to dry heat while they are being tumbled or agitated. As the heat contacts different surfaces of the kernel it penetrates into the center. This may be somewhat compared to heat at the center of the earth being built up by intermittent radiation of the sun on different surfaces thereof. As a kernel of corn rolls on a hot surface the cooler side of the kernel draws heat inwardly from the warmer side toward the center of the kernel. In any event, in the dry popping process a greater portion of the corn kernel expands than in the wet popping process, thus rendering the popped corn more edible.

Machines for the dry popping of popcorn have heretofore been generally designed for the commercial market where the corn is popped in large quantities. They have normally been gas heated. Electrical heating means have also been used as exemplified by U.S. Pat. No. 3,931,757 to Goode.

Other machines which utilize the rotary drum concept for corn popping are shown in U.S. Pat. Nos. 2,606,489; No. 3,253,532; No. 2,812,704; No. 1,516,782; No. 1,976,425; and No. 1,937,318. All of these are relatively large expensive machines which are coin operated or used in theaters or the like and do not lend themselves to domestic use.

One of the principal problems in dry popping of popcorn is the separating of the fully popped and edible kernels from those which remain unpopped or only partially popped. These and other problems are believed to be met by the present invention.

SUMMARY OF THE INVENTION

A principal object of the present invention is to provide a popcorn popper which utilizes the dry popping process and which automatically separates the fully popped kernels from those which are unpopped or only partially popped.

Another object of the invention is to provide a popcorn popper wherein the temperature of the kernels prior to popping may be carefully controlled while tumbling the kernels to raise the temperature uniformly throughout the kernel.

Another object of the invention is to provide a corn popper wherein the popped corn is removed from the high temperature popping chamber promptly after popping to reduce shrinkage, drying out or burning of the popped blossom which may be caused by further heating.

Another object of the invention is to provide a corn popper of the dry popping type which can be manufactured small enough and at a low enough cost to make it practical for domestic use.

Still another object of the invention is to provide a corn popper wherein the popped corn will automatically be discharged into a suitable container for eating.

With these and other objects in view the invention broadly comprises a machine for popping corn wherein the corn kernels are deposited in a heated rotating drum in which the popping occurs. The drum has an inner cylindrical chamber with a catch gate which allows unpopped corn to bypass but which collects expanded popped corn into the chamber. The inner chamber has conveyor means for carrying the popped corn to a point where it is deposited into a discharge chute. The machine has a drive motor for rotating the drum and a fan for blowing popped corn from the discharge chute into a suitable container.

BRIEF DESCRIPTION OF THE DRAWINGS

In the drawings:

FIG. 1 is a front elevation of the popper with a receptacle for the popped corn shown in broken lines.

FIG. 2 is a right side elevational view of the popper with portions of the housing broken away to show the drive motor and the drive trains from the motor to the popping drum and the discharge blower fan.

DESCRIPTION OF THE INVENTION

Figure 3:
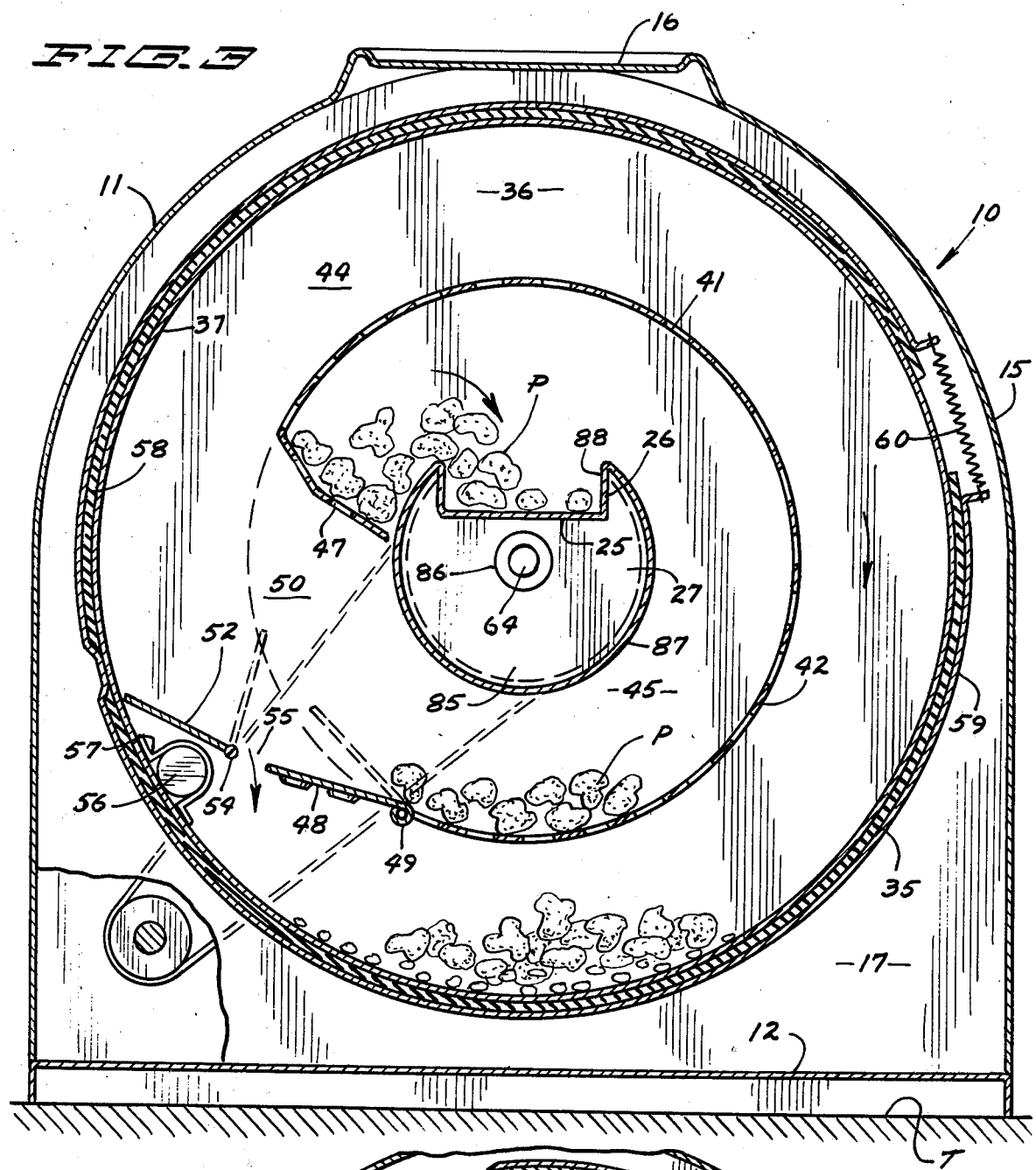
FIG. 3 is an enlarged vertical section through the housing and popping drum taken on line 3—3 of FIG. 2.

Referring now more particularly to the drawings reference characters will be used to denote like parts or structural features in the different views. The corn popper or popping machine is denoted generally by the numeral 10 and is shown positioned on a table top or other horizontal supporting surface T. The popper has an outer housing 11 which has a base 12, a rear wall 14, and an arched side and top wall 15. The top of wall 15 has a dished portion 16 (FIG. 3), the purpose of which will be later explained. The housing 11 also includes a partition wall 17 just forward of the rear wall 14 and a front wall 18, best seen in FIG. 1, which has a circular opening 19 therein. The base 12 extends a substantial distance forwardly beyond the front wall 18 (FIGS. 2 and 5).

A motor and fan housing 20 is mounted on base 12 forwardly of housing 11, as shown in FIGS. 1 and 2. This housing 20 is box-shaped and has a screened inlet opening 21 in the front wall thereof. A portion of the housing 20 extends inwardly as at 22 toward the center axis of the popper.

Figure 5:
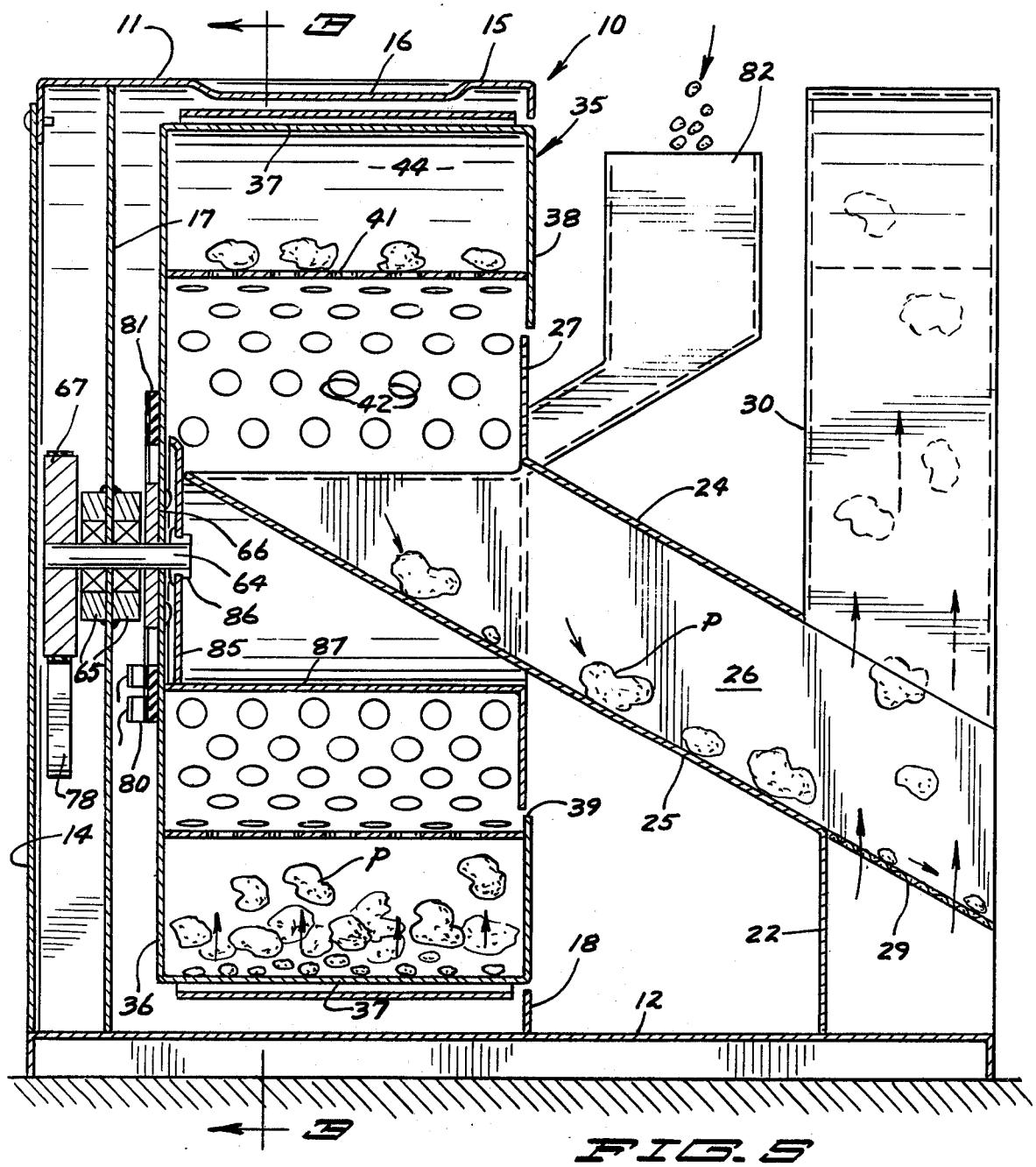
FIG. 5 is a fore and aft vertical section through the popper taken on line 5—5 of FIG. 1 and looking in the direction of the arrows with kernels of corn in various positions during the popping process.

A discharge chute 24, best shown in FIG. 5, extends upwardly and rearwardly into the central portion of the housing 11. This chute has a bottom wall 25 and parallel upright side walls 26. The upper portion of the chute 24 is connected to a disk-shaped plate 27. The plate 27 covers a front opening in the popping drum which will shortly be described. The lower end of the chute 24 rests upon the top of the motor and the fan housing extension as best shown in FIG. 5 and has a screen portion 29 in its bottom wall 25 so that any air being blown outwardly from the fan housing into its extension 22 will rise upwardly through the screen 29.

The upper end of chute 24 is also connected to a disk 85 which has a bearing member 86 mounted in the center thereof. Disk 85 is also connected to a tube 87 which is open at the top as at 88 with the sides of said opening connected to the upper edges of the side walls 26 of the trough. Accordingly, the trough 24, plate 27, disk 85, bearing 86 and tube 87 are all formed as an integral unit.

A discharge spout denoted generally at 30 is mounted to extend upwardly from the lower end of chute 24. This spout is generally square in cross section and its upper end curves laterally outward as best seen in FIG. 1. At the extended end of the chute 30 the bottom wall is provided with an opening 31 while the top wall immediately above the opening 31 is provided with perforations 32 which allow forced air to escape therethrough but which are sufficiently restricted to prohibit the passage of popped kernels of corn.

The popping drum mounted within the housing 11 will now be described. It is denoted generally by the number 35. It is of cylindrical design and has a rear wall 36, a cylindrical outer wall 37, and an annular front wall 38 leaving a circular opening 39 in the front of the drum. This opening is substantially filled by the plate 27 on the chute 24. An inner circular wall 41 is mounted in the drum concentrically with the outer wall 37. This wall is highly perforated with openings 42 which are of sufficient size to pass an unpopped corn kernel but not a popped kernel. The annular space between the walls 41 and 37 within the drum may generally be referred to as an expansion or popping chamber 44 while the space between the wall 41 and tube 87 may best be referred to as the discharge chamber 45.

A carrier blade 47 is mounted to extend inwardly from the wall 41 across the entire width of the discharge chamber 45. A second blade 48 which is referred to as a director blade or separator gate is pivoted to the wall 41 as by pin 49 and this blade also extends across the fore and aft width of the drum but is tiltable by a control 51 on pin 49 between the full and broken line positions shown in FIG. 3. There is a substantial opening 50 in the wall 41 between the blades 47 and 48.

A guide or director blade 52 is pivoted on a pin 54 which extends between the rear and front walls 36 and 38 of the drum. This blade is mounted immediately opposite the blade 48 so that there is a space 55 between pin 54 and the outer edge of plate 48 when the drum is in the position shown in FIG. 3 which is large enough to allow the passage of unpopped kernels through the space but small enough to prohibit the passage of popped kernels therethrough. Blade 52 is normally frictionally retained in its outer position against the wall 37 but may be tilted inwardly to the position shown in FIG. 4 by a suitable control on pin 54.

A thermostat 56 is held by a bracket 57 against the interior side of wall 37. This has suitable electrical connection with an electric heater band 58 which has wires embedded in a silicone rubber material. The band 58 is held in encircling relation against the outer side of wall 37 by a retainer ring 59 the ends of which are interconnected by a spring 60.

The drum 35 is journaled for axial rotation by being mounted on a shaft 64 which extends through bearings 65 disposed on both sides of the partition wall 17. There is also a supporting disk 66 on the rear side of drum rear wall 36. The rear end of shaft 64 carries a pulley 67. Bearing 86 slips on to the forward end of shaft 64 to support the upper end of the chute 24 assembly.

The motor and fan housing 20 contains an electric gear motor 70 mounted on a bracket 71 and having a lead 72 to a suitable electric source. The motor shaft on one side has a driving connection with a fan 74 adapted to force air taken in through screen 21 into the housing extension 21. Motor 70, through a gear reduction mechanism and a belt and pulley assembly 75, also has a driving connection with a shaft 76 which has its rear end portion journaled in partition wall 17. Shaft 76 carries a pulley 77 which has a driving connection with pulley 67 through belt 78.

A wiper mechanism 80 preferably having electrical connection with the same input line as the motor 70 conveys electricity to the heating element 58 through a rotor 81 and a wire connection in a well known manner.

The numeral 82 denotes a loading chute which extends downwardly through plate 27 and which is mounted thereon.

In operation the electric current is turned on to cause the motor to drive the drum 39 and fan 74. Due to the gear reduction mechanism the drum is, of course, rotated at a much lower speed. The heater 58 also becomes operative to heat the drum. A cup of butter or the like to be later applied to the popped corn may be placed on tray 16 for heating. A measured quantity of unpopped corn is poured through the chute 82 into the discharge chamber 45 from which it falls through openings 42 into the popping or expansion chamber 44. This will normally settle to the bottom as seen in FIG. 3. As the blade 52 which rotates with the drum passes under the mass of corn kernels, they will pass over the blade and through gap 55 back into the popping chamber. This continues until the kernels begin to pop.

As the kernels pop they of course become enlarged to the point where they cannot pass through the opening 55 and will slide along gate 48 into the discharge chamber 45 which has a lower temperature than the popping chamber 36. Any unpopped kernels that accidentally are carried into chamber 45 will again return to chamber 44 through the openings 42. The popped corn blossoms will be picked up by the carrier blade 47 and conveyed upwardly to the point where they are dumped into the upper open end of chute 26, as also shown in FIG. 3.

The popped corn, denoted by the letter P, will then tumble down the chute 24 until it reaches the area above the screen 29. Air from the fan 74 flowing upwardly through the screen 29 creates an air stream upwardly through the discharge spout 30 from which it is discharged into a container C (FIG. 1). Only corn components of the lowest density will be blown upwardly through spout 30 for ultimate consumption. The remaining only partially popped kernels will be discharged through a small opening 89 at the end of the chute into a receptacle.

Figure 4:
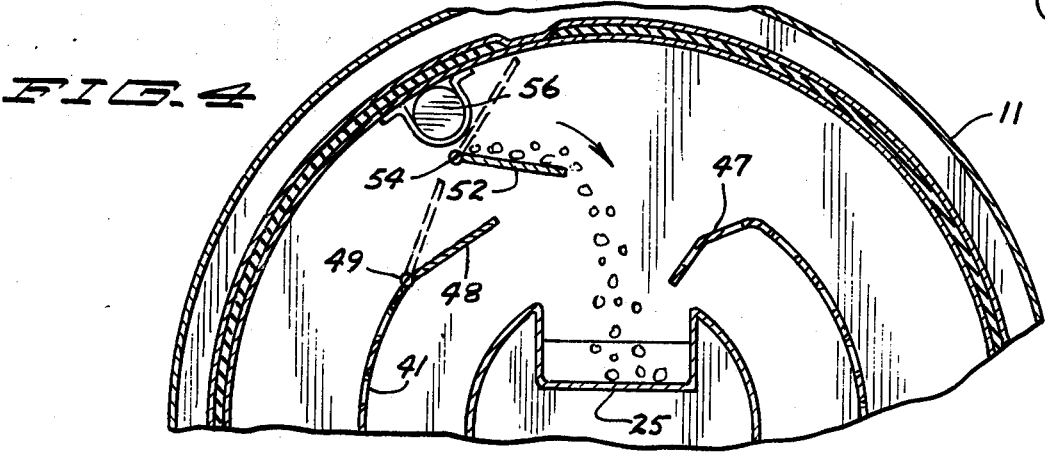
FIG. 4 is a fragmentary sectional view of the upper portion of the popper similar to FIG. 3 but showing the popping drum in a different position of rotation.

After the popping cycle the blade 52 and gate 48 may be flipped inwardly to the broken line positions in FIG. 3 to release any kernels that may have stuck to blade 52 and any popped corn that may have become caught between gate 48 and pin 54. Gate 48 may be loosely pivoted to automatically swing to the inner position when it goes through the top of its running cycle as shown in FIG. 4.

It is found that a satisfactory heating range of the outer wall 37 of the drum is between 550° and 565° F. though this may of course vary.

By carefully controlling the temperature of the heated surface and simultaneously rolling the kernels on the surface there is maximum uniformity of heating throughout the kernel prior to the popping explosion. This ensures a maximum expansion of the body of the kernel upon popping and maximum disintegration of the hull.

By promptly transferring the popped corn P after popping from the popping chamber 44 into the cooler discharge chamber 45, there is little if any shrinkage in the popped corn. This leaves the popped corn in a most light and edible state.

The invention accordingly economically and effectively carries out the aforementioned objectives.

What I claim to be new and desire to protect by United State Letters Patent is:

1. In a popcorn popper,
    (a) an outer housing,
    (b) a roasting drum mounted in the housing for rotation on its horizontal center axis,
    (c) drive means for rotating the drum,
    (d) said drum having a popping chamber and a discharge chamber,
    (e) heating means for heating the popping chamber,
    (f) means for depositing corn kernels in the popping chamber for popping therein as the drum is rotated,
    (g) separator means between the popping chamber and discharge chamber for directing corn kernels after they are popped into the discharge chamber, and
    (h) means for discharging popped corn from the discharge chamber and out of the roasting drum while the drum continues to rotate.

2. The subject matter of claim 1 wherein the popping chamber encircles the discharge chamber.

3. The subject matter of claim 2 wherein the separator means comprises a director member disposed within the popping chamber for directing popped corn into the discharge chamber during rotation of the drum, said director member defining an opening in the popping chamber of such a size as to permit unpopped kernels to bypass the member and be retained in the popping chamber.

4. In a popcorn popper,
    (a) an outer housing,
    (b) a roasting drum mounted in the housing for rotation on its horizontal center axis,
    (c) drive means for rotating the drum,
    (d) heating means for transmitting heat to the drum,
    (e) said drum having inner and outer concentrically positioned cylindrical walls providing an inner discharge chamber within the inner wall and a popping chamber between the walls,
    (f) means for depositing corn kernels in the popping chamber for popping therein as the drum is rotated.
    (g) separator means between the inner and outer cylinders for causing corn popped in the popping chamber to move into the discharge chamber,
    (h) a discharge chute having open communication with the discharge chamber, and
    (i) means on the inner cylinder for directing popped corn therein into the discharge chute.

5. The subject matter of claim 4 wherein the separator means comprises a gate extending outwardly from the inner wall toward the outer wall and angling forwardly relative to the direction of rotation to guide kernels popped in the popping chamber into the discharge chamber.

6. The subject matter of claim 4 wherein the chute opens upwardly within the discharge chamber and the said inner wall has a carrier blade directed inwardly therefrom in a generally radial direction to carry popped corn in the discharge chamber upwardly during rotation and dump it into the chute.

7. In a popcorn popper having a base frame,
    (a) a rotary drum in which corn is popped mounted on the frame,
    (b) motor means on the frame having driving connection with the drum for rotating the same while corn is popped therein,
    (c) a discharge chute on the frame angling downwardly and outwardly from the drum,
    (d) means in the drum for discharging popped corn from the drum into the chute,
    (e) a discharge spout extending upwardly from the extended end of the chute,
    (f) a fan driven by the motor means, and
    (g) conduit means connecting the fan with the extended end of the chute to conduct an air blast from the fan to blow popped corn discharging through the chute upwardly through the spout.

8. The subject matter of claim 7 wherein the upper end of the spout curves outwardly and then downwardly to convey popped corn into a container placed thereunder.

* * * * *